United States Patent [19]
Monson

[11] Patent Number: 5,826,463
[45] Date of Patent: Oct. 27, 1998

[54] BRAKE FOR MOTORCYCLES HAVING FOOT BOARDS

[76] Inventor: Brant Monson, 3875 N. Cove Dr., Provo, Utah 84604

[21] Appl. No.: 763,516

[22] Filed: Dec. 11, 1996

[51] Int. Cl.⁶ .................. B62L 3/04; G05G 1/14
[52] U.S. Cl. .................. 74/512; 74/560; 74/564
[58] Field of Search .............. 74/512, 564, 560; 180/219

[56] References Cited

U.S. PATENT DOCUMENTS

| | | | |
|---|---|---|---|
| 1,629,381 | 5/1927 | Hill | 74/560 |
| 3,733,922 | 5/1973 | Tripp . | |
| 3,853,020 | 12/1974 | Clark, III . | |
| 3,939,726 | 2/1976 | Ahrens . | |
| 4,002,084 | 1/1977 | Martins . | |
| 4,083,263 | 4/1978 | Lundquist . | |
| 4,295,385 | 10/1981 | Huttenhow . | |
| 4,299,139 | 11/1981 | Krüger et al. . | |
| 4,456,090 | 6/1984 | Malenotti | 180/219 |
| 4,633,727 | 1/1987 | Pike . | |
| 5,074,163 | 12/1991 | Baumann | 74/512 |
| 5,354,086 | 10/1994 | Mueller | 74/564 |
| 5,555,774 | 9/1996 | Lauring et al. | 74/512 |

FOREIGN PATENT DOCUMENTS

4-27687  1/1992  Japan ................. 74/560

Primary Examiner—Rodney H. Bonck
Assistant Examiner—Troy Grabow
Attorney, Agent, or Firm—Thorpe, North & Western, L.L.P.

[57] ABSTRACT

A brake for motorcycles includes an improved brake lever assembly having a brake pad arm configured for attachment at one end to a brake pad, and connected at an opposing end to a brake actuator arm by a rotatable collar. The brake pad arm and the brake actuator arm are disposed relative to one another such that the angle of the brake pad arm is lower than the prior art, thereby enabling actuation of the brake with less foot movement and causing less fatigue in frequent braking situations. While the prior art typically has an angle of 30–35 degrees between the brake pad arm and the brake actuator arm, the present invention maintains a preferred offset angle of 50 to 65 degrees between the brake pad arm and the brake actuator arm.

19 Claims, 6 Drawing Sheets

BRAKE FOR MOTORCYCLES HAVING FOOT BOARDS

BACKGROUND OF THE INVENTION

1. Field of the Invention

The present invention relates to a brake for motorcycles, and, more particularly, to a foot brake for use with motorcycles having foot boards on which the user may rest his or her feet while riding.

2. State of the Art

The use of large motorcycles, such as Harley-Davidsons, has found a renewed popularity in recent years. The popularity of such motorcycles which have foot boards instead of conventional foot pegs has increased at an even faster rate. The foot boards enable the rider to place his or her feet on a small board on each side of the motorcycle while riding.

The foot board used with the motorcycle is advantageous because the rider's foot is able to rest flat on the foot board, rather than resting on a foot peg. Those familiar with motorcycle touring will appreciate that the foot pegs provide little support for the lower leg, and can often result in sore ankles, etc., after long rides.

Figure 1A:
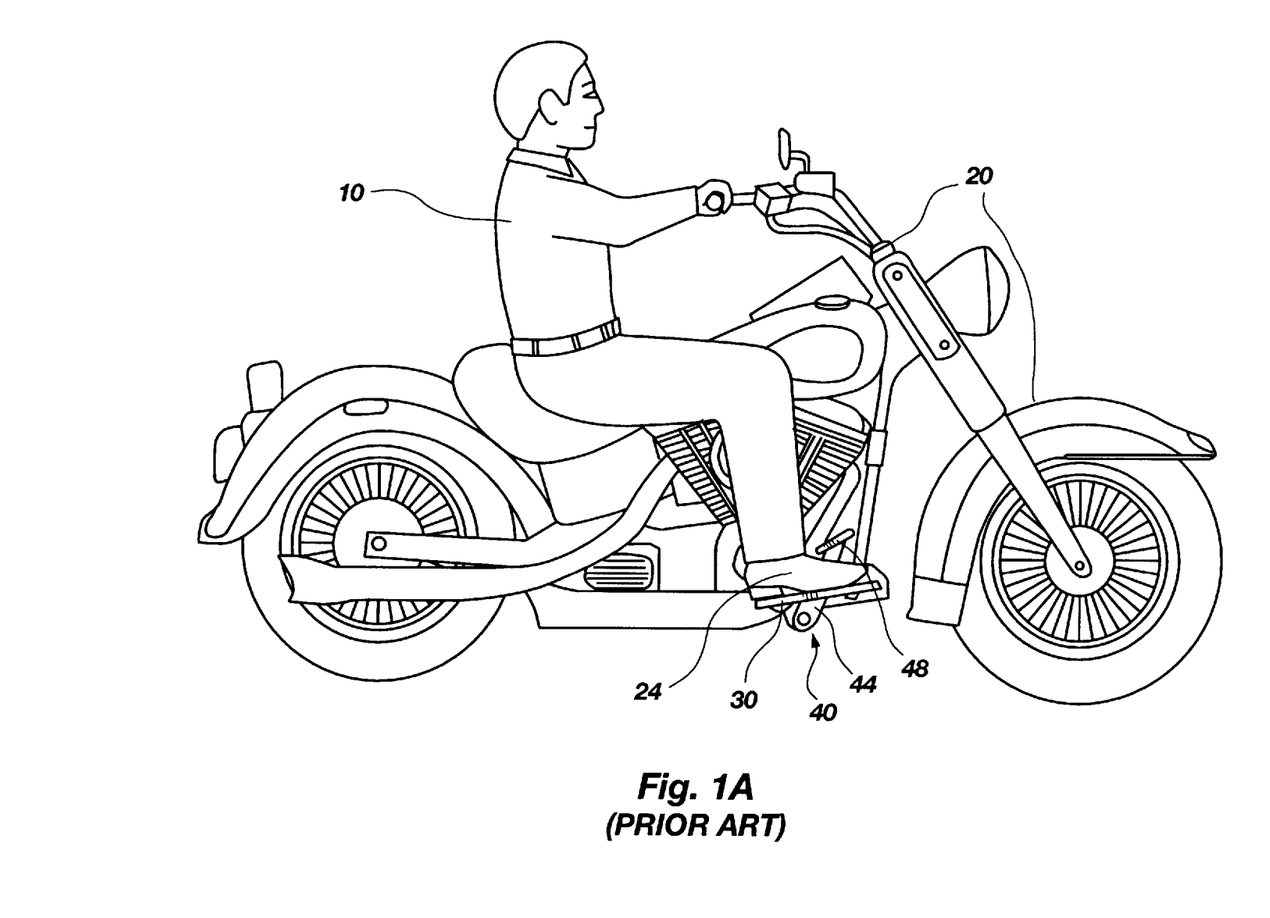
FIG. 1A shows a side view of a person riding a motorcycle having a foot board and a foot brake made in accordance with the teachings of the prior art.

One problem which is present with the configurations which use the foot boards is that the brake is very uncomfortable to use. In FIG. 1A there is shown a perspective view of a rider 10 on a motorcycle 20. The rider's foot 24 is resting on the foot board 30 near the bottom of the motorcycle 20. The brake lever arm 40 has a brake pad arm 44 which brake assembly 40 extends upwardly above the foot board 30.

Figure 1B:
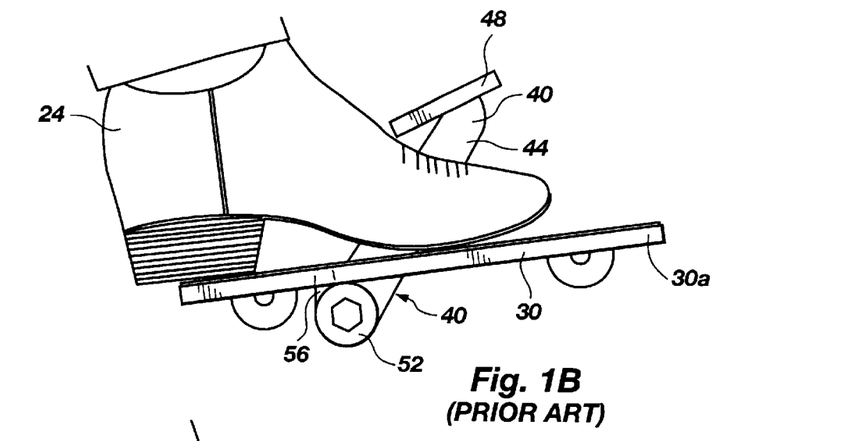
FIGS. 1B through 1D show close-up side views of the foot board and the lever arm and pedal of the prior art foot brake shown in FIG. 1A as the foot of a rider shows the different movements necessary to actuate the brake when the foot begins in the position shown in FIG. 1A.
Figure 1C:
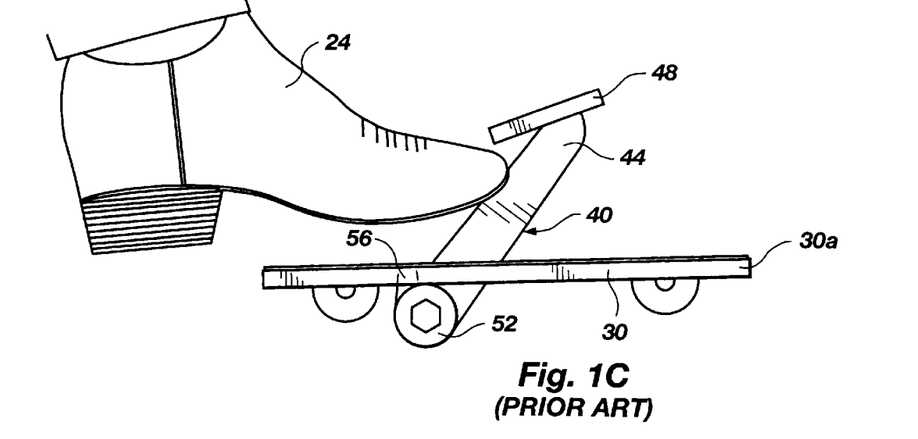
Figure 1D:
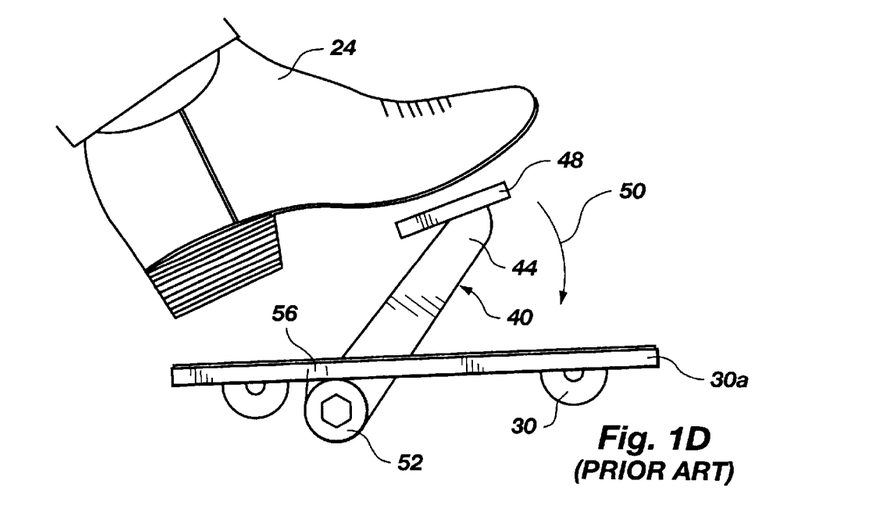
Figure 1E:
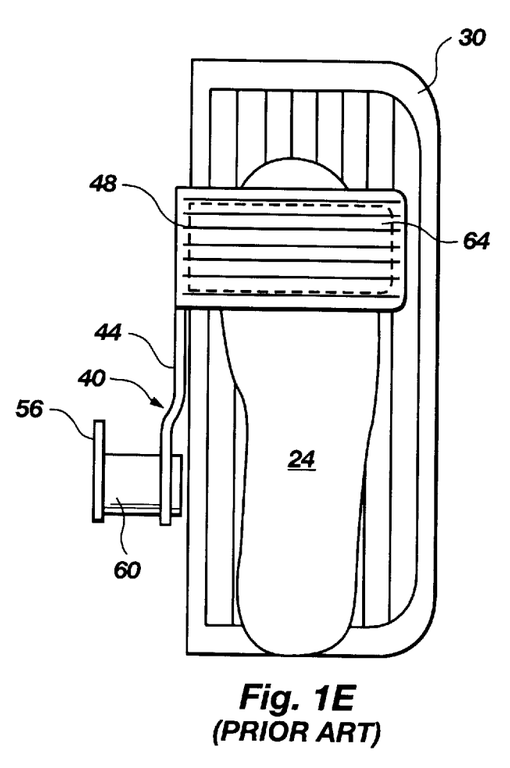
FIG. 1E shows a top view of the prior art foot brake lever assembly shown in FIGS. 1A through 1D, along with a conventional floor board.

In FIGS. 1B through 1D there are shown close-up views of the rider's foot 24, the foot board 30, and the brake lever arm 40. As will be appreciated by those who have used such motorcycles, the design and positioning of the brake lever arm 40 results in a leg position which is uncomfortable, and which inhibits rapid deceleration as may be needed during an emergency.

Specifically, the brake lever assembly 40 is positioned so that a brake pad arm 44 extends upwardly and terminates at a position nearly one-half the distance of the foot board 30 distally from the front end 30a of the foot board. Likewise, the brake pad 48 attached to the end of the brake pad arm 44 is positioned several inches rearwardly from the front end 30a of the floor board 30.

The positions of the brake pad arm 44 and brake pad 48 result in the user's leg being bent at the knee at such an angle (typically about 90 degrees) that the position can become very uncomfortable on long rides. The only way to alleviate some of the pressure which is placed on the knee is to slide the foot 24 forward under the brake pad 48 as is shown in FIG. 1B. However, when the rider must use the braking assembly 40, he or she must move the foot 24 out from under the brake pad 48. Typically this is accomplished by pulling the foot 24 rearwardly as shown in FIG. 1C. Once the foot 24 has been moved sufficiently rearward to enable it to be lifted above the brake pad 48, the foot is moved into position on top of the brake pad as shown in FIG. 1D. The rider then pushes downwardly on the brake pad as indicated by arrow 50. The downward force causes the brake pad arm 44 to rotate about a pivot point 52, and moves a brake actuator arm 56 which is connected to the brake cylinder (not shown) or some other brake mechanism which actuates the brake attached to the wheel.

In order to move the foot 24 into the proper position for braking, the rider 10 must either move the foot rearwardly, lift the foot, move the foot forwardly onto the brake pad 48 and push down as shown in FIGS. 1B through 1D; or slide the foot laterally outward past the brake pad, lift the foot, move the foot inwardly until it is positioned over the brake pad and push down. Either method which is used causes fatigue if performed often, e.g. when riding in a city, and dramatically increases reaction time in emergencies. The combination of fatigue and increased reaction time significantly lessens the safety which would be present with an improved brake lever assembly. Additionally, the arcuate movement path along which the brake pad 48 follows is somewhat awkward for many riders. (The movement of the foot is more of a downward movement than a forward movement).

After the brake has been applied and released, the rider must go through another series of movements to return the foot 24 to the original position. In a city or other stop and go traffic, the repeated process can become annoying.

Thus, there is a need for a brake lever assembly which may be used with motorcycles having foot boards which enables the rider to place his or her foot in a more comfortable position on the foot board, which does not cause fatigue when used frequently, and which improves reaction time when braking in an emergency. Such a brake lever assembly should be simple to install and use, and should not interfere with any other aspects of motorcycle operation.

SUMMARY OF THE INVENTION

Thus, it is an object of the present invention to provide an improved foot brake lever assembly for motorcycles having foot boards.

It is another object of the invention to provide such a brake lever assembly which is less fatiguing than the prior art when used frequently during traffic congestion and the like.

It is yet another object of the present invention to provide such a brake lever assembly which does not require excessive movement of the lower leg to move the brake lever assembly, and which decreases reaction time during emergency braking situations.

Still another object of the present invention is to provide such an improved lever arm which is inexpensive, easy to install, and easy to use.

The above and other objects of the invention are realized in specific illustrated embodiments of an improved brake lever assembly having a brake pad arm configured for attachment at a first end to a brake pad, and for attachment to a motorcycle at a second end. The second end of the brake pad arm also is connected to a brake actuator arm so that movement of the brake pad arm causes a like range of movement in the brake actuator arm.

The brake pad arm and the brake actuator arm are disposed relative to one another such that the angle of the brake pad arm relative to the brake actuator arm is greater than the prior art, thereby causing the brake pad arm to be disposed at a lower angle relative to the motorcycle. Such a position enables actuation of the brake with less foot movement. Typically, the brake of the present invention may be actuated without the heel of the rider's foot ever being lifted off the foot board 30. Rather, the front of the foot may be lifted and rotated into place over the brake. Such a range of motion causes considerably less fatigue in frequent braking situations. The prior art typically has an angle of 30–35 degrees between the brake pad arm and the brake actuator arm resulting in the angle of the brake pad arm to the motorcycle floor board being about 60 degrees. In contrast, the present invention maintains a preferred angle of 50 to 65 degrees, lowering the angle of the brake pad arm with respect to the motorcycle floor board to an angle of between about 30 and 40 degrees, and preferably between 30 and 35 degrees.

In accordance with one aspect of the present invention, the brake pad arm is sufficiently long so that it extends forwardly to a position adjacent the front end of the floor board, thereby providing more available foot room on the floor board. Additionally, the brake pad is placed in a lower position so that the brake pad can be moved without the rider lifting his or her foot from the floor board.

In accordance with another aspect of the present invention, the first end of the brake arm is configured to receive a brake pad at an angle substantially parallel with the long axis of the brake pad arm. The orientation of the brake pad provides a more natural position which corresponds with the movement of the foot when the heel remains on the floor board.

In accordance with yet another aspect of the present invention, the brake pad arm has a brake pad support which extends less than 1 inch from the brake pad arm, and the brake pad is attached to the brake pad support so that the brake pad extends partially over the brake pad arm, thereby eliminating the necessity for the rider to move his or her foot laterally from a position below the brake pad prior to lifting of the foot. Rather, the rider's foot can be disposed on the foot board laterally outwardly from the brake pad and then pivot over the brake pad when necessary to actuate the brake.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Referring again to FIGS. 1A through 1E, there is shown the brake lever assembly 40 commonly used in the prior art. The brake lever assembly 40 is formed with a brake pad arm 44 and a brake actuator arm 56 which are connected together by a collar or sleeve 60. The brake pad arm 44 and the brake actuator arm 56 are typically disposed at an angle of 30–35 degrees relative to one another. This angle and the length of the brake pad arm 44 causes the brake pad 48 attached to the brake pad arm to be positioned inconveniently. Additionally, because the brake pad support 64 and the brake pad 48 extend so far outwardly, the entire lower leg must be moved for braking if the foot has slid or been moved into position under the brake pad. While this brake configuration can be uncomfortable when used for prolonged periods of the time or in situations requiring frequent braking, the configuration has been used for approximately 40 years on Harley-Davidson motorcycles and the like.

Figure 2:
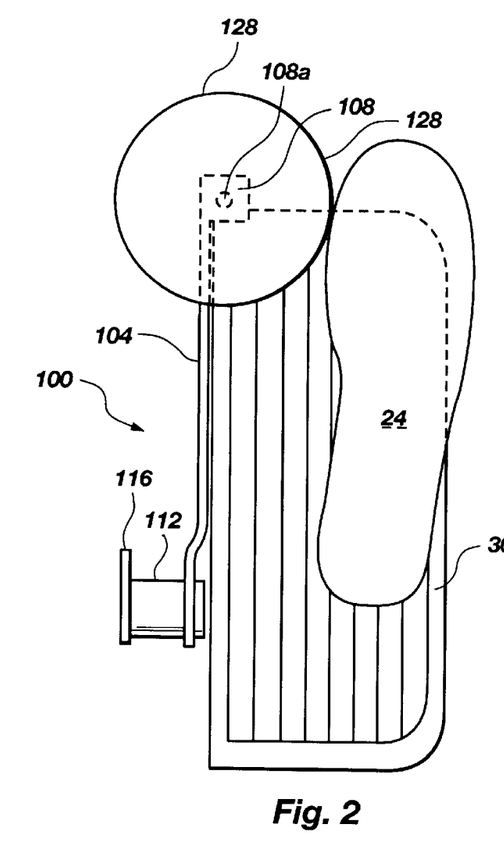
FIG. 2 shows a top, partially cut away view of a foot brake lever assembly for use with motorcycles disposed adjacent a conventional foot board in accordance with the principles of the present invention.

Turning now to FIG. 2, there is shown a top view of a brake lever assembly, generally indicated at 100, made in accordance with the principles of the present invention. Like the brake lever assembly 40 of the prior art, the brake lever assembly 100 of the present invention includes a brake pad arm 104, with a brake pad support 108 attached adjacent one end 104a thereof. The brake pad support 108 has a threaded hole 108a to receive a bolt for attaching a brake pad 128.

The opposing end 104b of the brake pad arm 104 is connected by a sleeve or collar 112 to a brake actuator arm 116. The sleeve or collar 112 slides onto a peg, not shown, on the motorcycle to enable the brake pad arm 104 and the brake actuator arm 116.

Unlike the prior art brake lever assembly 40 shown in FIGS. 1A through 1E, wherein the brake pad arm 44 is about 8 inches long, the brake pad arm 104 of the present invention is typically about 9 to 10 inches long. As will be discussed in detail below, the longer brake pad arm 104 enables the brake pad support 108 to be positioned at the end of the foot board 30.

Another difference between the present invention is the brake pad support 108. The brake pad support 64 of the prior art extends about 3–4 inches outwardly from the brake pad arm 44, and is tilted to an angle of about 35 degrees from the long axis of the brake pad arm, so that the top of the brake pad support 64 and the brake pad 48 are nearly horizontal when the brake lever assembly 40 is attached to the motorcycle (FIGS. 1A through 1D).

In contrast, the brake pad support 108 of the present invention is approximately between ½ and 1 inch wide by ½ and 1 inch long, and the brake pad support is disposed generally parallel with the long axis A—A (FIG. 3) of the brake pad arm 104. As will be discussed with respect to FIGS. 4A through 4C, the positioning of the brake pad support 108 enables the brake pad 128 to be placed in a position along the foot board 30 which does not cause the knee to be bent at a 90 degree angle. Additionally, because the brake pad 128 extends outwardly only about 1.5 inches on either side of the brake pad arm 104, the rider is able to slide his or her foot forward so that it extends over the end of the foot board 30 without causing the foot to be disposed below the brake pad 128. Such a position is both more comfortable for the rider and safer in the event that emergency braking is necessary.

Figure 3:
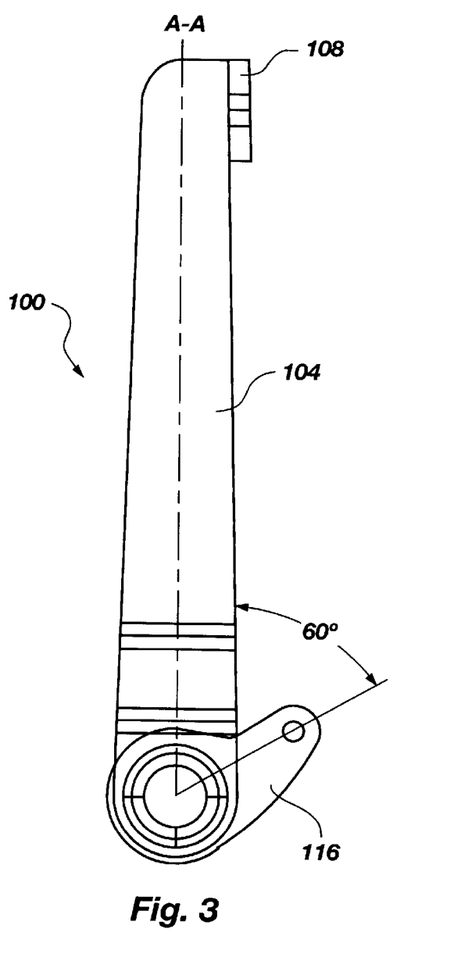
FIG. 3 shows a side-view of the brake lever assembly shown in FIG. 2.

Referring now to FIG. 3, there is shown a side view of the brake lever assembly 100, made in accordance with the principles of the present invention. Unlike the prior art, the brake pad arm 104 and the brake actuator arm 116 are not disposed at an angle of between 30 and 35 degrees. Rather, the two arms are offset between 50 and 65 degrees, and preferably about 60 degrees. The brake pad arm 104 is approximately one inch longer in the prior art, and the brake pad support 108 is disposed generally parallel with the long axis A—A of the break pad arm. When the brake lever assembly 100 is attached to the motorcycle, the offset between the brake pad arm 104 and the brake actuator arm, the length of the brake pad arm and the disposition of the brake pad support 108 result in a braking mechanism which is easier and less tiresome to use under almost any conditions. Additionally, the resulting braking mechanism significantly reduces reaction time in emergencies.

Figure 4A:
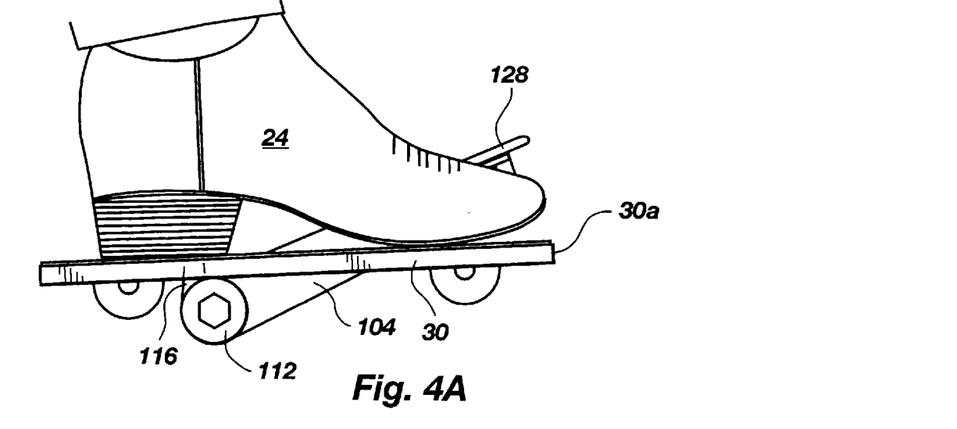
FIGS. 4A through 4C show close-up side views of the brake lever assembly used on a motorcycle having foot boards in accordance with the principles of the present invention as the foot of the rider moves through the necessary movements to actuate the brake.
Figure 4B:
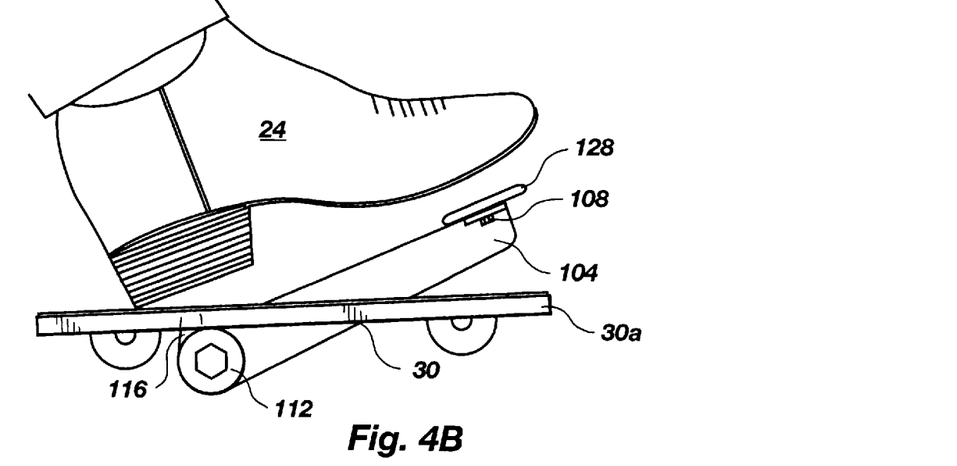
Figure 4C:
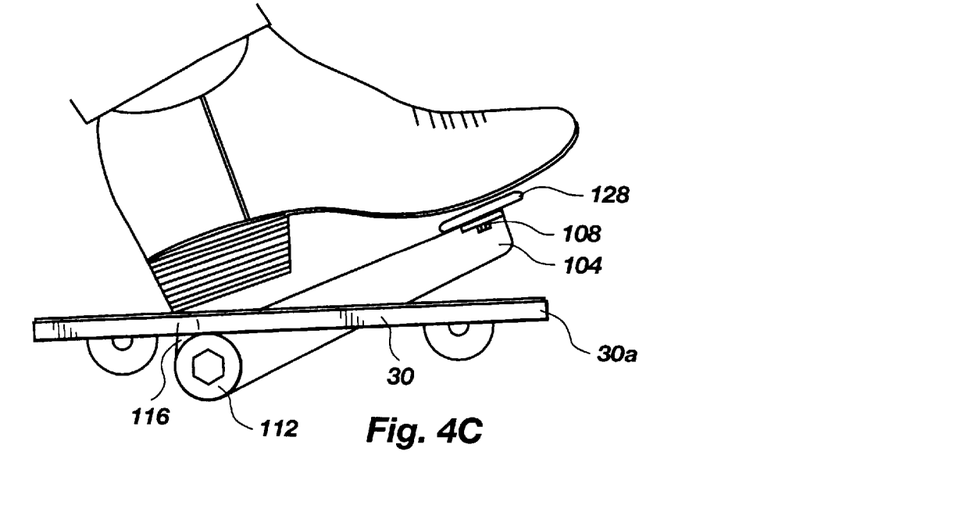

Referring now to FIGS. 4A through 4C, there are shown side views of the brake lever assembly 100 attached to a motorcycle with foot boards 30 in accordance with the principles of the present invention. The figures demonstrate the foot movements necessary to activate the brake in contrast to those shown in FIGS. 1B through 1D with respect to the prior art.

Because of the increased angle between the brake actuator arm 116 and the brake pad arm 104, the brake pad arm is positioned at a much lower angle (i.e. between about 30 and 35 degrees) with respect to the motorcycle. This lower angle and the longer brake pad arm 104 enable the brake pad support 108 and the brake pad 124 to be positioned adjacent the front end 30a of the foot board.

Because the brake pad 108 is positioned adjacent the front end 30a of the foot board 30, the rider is able to move his or her foot forward four to six inches further than with the prior art configuration. This enables the rider to hold his or her knee in a much more comfortable position. Additionally, because the foot is not disposed underneath the brake pad 124 and because the brake pad is positioned only 2–3 inches above the level of the foot board 30, reaction time for emergency braking situations is significantly improved.

In order to brake from the position shown in FIG. 4A, the rider need only raise the front of his or her foot 24 (FIG. 4B), pivot the foot about the heel (FIG. 4C) and let the front of the foot push down on the brake pad 128 as indicated by arrow 132. As shown in FIGS. 4A through 4C, the brake pad 128 can be disposed adjacent the front end 30a of the foot board 30. In the alternative, the brake pad arm 104 may be long enough to position at least part of the brake pad 128 beyond the front end 30a of the floor board 30.

Figure 5:
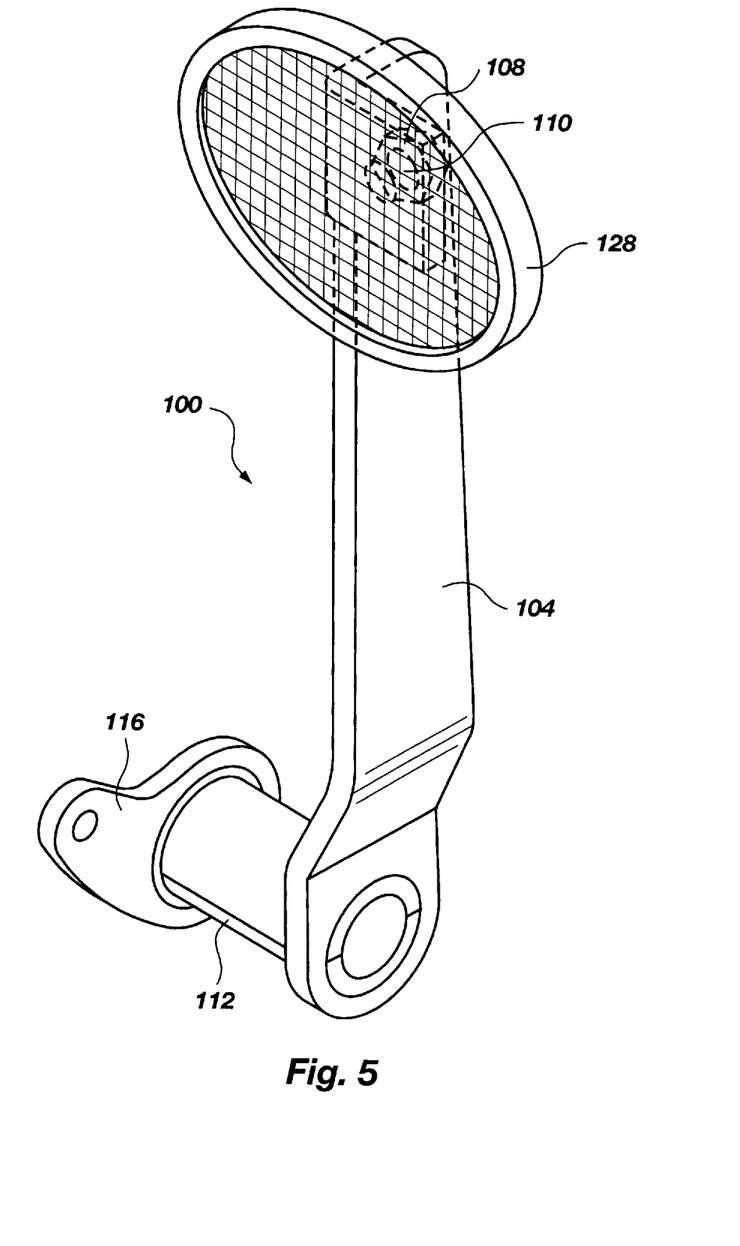
FIG. 5 shows a perspective view of the brake lever assembly of FIGS. 2 and 3 with a brake pad attached in accordance with the principles of the present invention.

Referring now to FIG. 5, there is shown a perspective view of the brake lever assembly 100, with a brake pad arm having a brake pad 124 attached thereto. Unlike the prior art wherein the brake extends 3–4 inches outwardly, the brake pad 124 is generally circular, and is disposed so that it is nearly centered over the brake pad arm. Preferably, the brake pad 124 is between 3 and 4 inches in diameter as it attached by a bolt 110, so that only about 2.5 inches is disposed to the right of the brake pad arm 104. This configuration enables a user to place his or her foot slightly over the end of the foot board 30 in the manner shown in FIG. 2.

Because the brake pad arm 104 is positioned to extend to the front end 30a of the foot board 30, the brake pad 124 may be positioned much lower, as it can move down into substantially the same plane as the foot board. Thus the rider is able to position his or her foot as far forward as the brake pad without having to move laterally to raise the entire foot for braking. Thus, the rider's foot may rest slightly beyond the front end of the foot board 30 without interfering with braking.

When the rider must apply the brakes, he or she need only lift the front of the foot and move it inwardly over the brake pad 124 by pivoting the foot on the heel. As will be appreciated in light of the present disclosure, simply moving the front of the foot 24 while keeping the heel on the foot board 30 significantly reduces fatigue on the rider and results in a much quicker reaction time under conditions when emergency braking is necessary. In addition to ease of braking and increased reaction time, the position of the brake pad 124 provides the rider with four to six additional inches of leg room, further decreasing fatigue on long rides.

Thus, there is disclosed an improved motorcycle brake for use with motorcycles having foot boards. Those skilled in the art will appreciate numerous modifications which can be made without departing from the scope or spirit of the present invention. The appended claims are intended to cover such modifications.

What is claimed is:

1. A brake lever assembly for motorcycles having foot boards, the brake lever assembly comprising:

a brake pad arm having a first end configured for attachment to a brake pad and a second end configured for attachment to a motorcycle; and a brake actuator arm having a first end configured for attachment to a braking mechanism and a second end, connected to the brake pad arm, configured for attachment to a motorcycle;

wherein the brake pad arm and the brake actuator arm are offset at an angle between 50 and 65 degrees.

2. The brake lever assembly for motorcycles of claim 1, wherein the brake pad arm and the brake lever assembly are offset approximately 60 degrees.

3. The brake lever assembly for motorcycles of claim 1, wherein the brake pad arm is at least 9 inches long.

4. The brake lever assembly for motorcycles of claim 1, wherein the first end of the brake pad arm forms a brake pad support for holding a brake pad, wherein the brake pad arm has a long axis, and wherein the brake pad support is disposed in parallel with the long axis of the brake pad arm.

5. The brake lever assembly for motorcycles of claim 4, further comprising a brake pad attached to the brake pad support, and wherein the brake pad is disposed generally parallel with the long axis of the brake pad arm.

6. The brake lever assembly for motorcycles of claim 4, wherein the brake pad is centered over the brake pad arm, and sized such that the brake pad extends laterally outwardly from the brake pad arm no more than 2.5 inches.

7. The brake lever assembly for motorcycles of claim 1, further comprising a circular brake pad attached to the first end of the brake pad arm.

8. A brake lever assembly for use with motorcycles having foot boards on which a rider may rest his or her feet, the foot boards having a front end, and wherein the brake lever assembly comprises:

a brake actuator arm having a first end configured for attachment to a braking mechanism such that forward movement of the brake actuator arm actuates the braking mechanism, and a second end configured for pivotable attachment to the motorcycle such that the brake actuator arm extends upwardly from the pivotable point of attachment when attached to the motorcycle;

a brake pad arm having a first end configured for attachment to a brake pad and a second end, attached to the second end of the brake actuator arm, for attachment to the motorcycle such that the brake pad arm extends upwardly and forwardly of the point of attachment; and a collar disposed between the second end of the brake actuator arm and the second end of the brake pad arm for connecting the brake actuator arm to the brake pad arm and configured for pivotably engaging the motorcycle; and wherein the brake actuator arm and the brake pad arm are offset at an angle between 50 and 65 degrees.

9. The brake lever assembly for motorcycles of claim 8, wherein the brake pad arm has a long axis extending from the first end to the second end, and wherein the first end is configured for holding a brake pad generally parallel with the long axis of the brake pad arm.

10. The brake lever assembly for motorcycles of claim 8, wherein the brake pad arm has a brake pad support configured at the first end, the brake pad support having a threaded hole formed therein for receiving a brake pad bolt.

11. The brake lever assembly for motorcycles of claim 8, wherein the brake pad arm is at least 9 inches long.

12. The brake lever assembly for motorcycles of claim 11, wherein the brake pad arm is configured to extend beyond the foot board of the motorcycle when the second end of the brake pad arm is attached to the motorcycle.

13. The brake lever assembly for motorcycles of claim 8, first comprising a circular brake pad affixed to the first end of the brake pad arm such that only a portion of said brake pad extends laterally over either side of the brake pad arm.

14. A method for forming a brake for a motorcycle having a foot board, the method comprising:

(a) selecting a motorcycle having a foot board with a front end;

(b) selecting a brake lever assembly having a brake pad arm with a brake pad at a forward most end, and a brake actuator arm connected to the brake pad arm and offset from the brake pad arm at an angle of between 50 and 65 degrees; and (c) attaching the brake lever assembly to the motorcycle such that the brake pad arm extends from the motorcycle forwardly to a position adjacent the front end of the foot board at an angle between about 30 and 40 degrees and such that the brake pad is no more than 3 inches above the foot board.

15. The method according to claim 14, wherein the method comprises, more specifically, positioning the brake pad arm so that the brake pad is disposed adjacent the front end of the foot board.

16. The method according to claim 15, wherein the brake pad extends beyond the front of the foot board.

17. The method according to claim 14, wherein the method comprises, more specifically, selecting a brake pad arm having a brake pad support, and attaching to the brake pad support a generally circular brake pad so that the generally circular brake pad is centered over the brake pad support.

18. The method according to claim 14, wherein the brake pad arm has a long axis, and wherein the method further comprises attaching the brake pad to the brake pad arm in such a manner that the brake pad is disposed generally parallel with the long axis of the brake pad support arm.

19. The method according to claim 14, wherein the brake pad arm and the brake actuator arm are offset at an angle of about 60 degrees.

* * * * *

US005826463C1

(12) REEXAMINATION CERTIFICATE (4373rd)
United States Patent
Monson (10) Number: US 5,826,463 C1
(45) Certificate Issued: Jun. 5, 2001

(54) BRAKE FOR MOTORCYCLES HAVING FOOT BOARDS (75) Inventor: Brant Monson, 3875 N. Cove Dr., Provo, UT (US) 84604

(73) Assignee: Brant Monson, Provo, UT (US)

Reexamination Request:
No. 90/005,673, Mar. 9, 2000

Reexamination Certificate for:
Patent No.: 5,826,463
Issued: Oct. 27, 1998
Appl. No.: 08/763,516
Filed: Dec. 11, 1996

(51) Int. Cl.$^7$ ................ B62L 3/04; G05G 1/14
(52) U.S. Cl. ................ 74/512; 74/560; 74/564
(58) Field of Search ............ 74/512, 564, 560, 74/562, 563; 180/219

(56) References Cited

U.S. PATENT DOCUMENTS

| | | |
|---|---|---|
| 1,102,940 | 7/1914 | Merchant . |
| 1,151,766 * | 8/1915 | Duffy ................ 74/563 |
| 1,297,202 * | 3/1919 | McGiehan ............ 74/563 |
| 1,328,400 | 1/1920 | Reich . |
| 3,911,760 | 10/1975 | Elbers et al. . |
| 4,043,217 | 8/1977 | Kleist . |
| 4,174,852 | 11/1979 | Panzica et al. . |
| 4,456,090 | 6/1984 | Malenotti . |
| 4,802,684 | 2/1989 | Bennett et al. . |
| 4,923,027 | 5/1990 | Hayashi et al. . |
| 5,354,086 * | 10/1994 | Mueller ............ 74/512 X |
| 5,476,162 | 12/1995 | Reed et al. . |
| 5,609,069 | 3/1997 | Swenson . |
| 5,662,195 | 9/1997 | Rush . |
| 5,779,254 | 7/1998 | James et al. . |

FOREIGN PATENT DOCUMENTS 60-50063   3/1985   (JP) .

OTHER PUBLICATIONS

Harley Davidson Catalogue 1914–1921 pp. 42–43.
1915 Harley Davidson Advertisement.
Indian America's Pioneer Motorcycle.
Harley Davidson Catalogue pp. 84–91.
V–Twin Manufacturing Catalogue pp. 230–234, 238, 239.
1984 Genuine Motorcycle Accessories Catalogue pp. 49, 55, 57.
1993 V–Twin Manufacturing Catalogue pp. 172–174.
Custom Chrome Catalogue (Identified as pp. TC 0000024–TC 0000026).
1987 Custom Chrome Catalogue (Identified as pp. TC 0000027–TC0000028).
1988 Custom Chrome Catalogue (Identified as pp. TC 000029–TC0000030).
Custom Chrome Catalogue (Identified as pp. TC 000031–TC 0000032).
Custom Chrome Catalogue (Identified as pp. TC 0000033, TC0000035 and TC0000036).
1991 Custom Chrome Catalogue pp. TC 0000037–TC0000040).
1992 Custom Chrome Catalogue pp. TC 0000041, TC0000042 and 331–333.
Custom Chrome Catalogue pp. TC 0000046 and 397–400.
2001 Indian Scout specifications from "www.indianmotorcycles.com", accessed Aug. 1, 2000.*
Harley–Davidson, Inc. Service Manual, 1978 ½ to 1984 FL/FX Models (cover page & figures 2–41, 2–42).
Harley–Davidson, Inc. Service Manual, 1985 to 1990, FX/Softail Models (cover page & pp. 2–39 to 2–40).
Harley–Davidson, Inc. Service Manual, 1991 to 1992, FLT/FXR Models (pp. 2–35 , 2–41, 2–43).

* cited by examiner

*Primary Examiner*—Mary Ann Green (57) ABSTRACT

A brake for motorcycles includes an improved brake lever assembly having a brake pad arm configured for attachment at one end to a brake pad, and connected at an opposing end to a brake actuator arm by a rotatable collar. The brake pad arm and the brake actuator arm are disposed relative to one another such that the angle of the brake pad arm is lower than the prior art, thereby enabling actuation of the brake with less foot movement and causing less fatigue in frequent braking situations. While the prior art typically has an angle of 30–35 degrees between the brake pad arm and the brake actuator arm, the present invention maintains a preferred offset angle of 50 to 65 degrees between the brake pad arm and the brake actuator arm.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8–19 is confirmed.

Claim 3 is cancelled.

Claim 1 is determined to be patentable as amended.

Claims 2, 4, 5, 6 and 7, dependent on an amended claim, are determined to be patentable.

New claim 20 is added and determined to be patentable.

1. A brake lever assembly for motorcycles having foot boards, the brake lever assembly comprising:

a brake pad arm having a first end configured for attachment to a brake pad and a second end configured for attachment to a motorcycle; and a brake actuator arm having a first end configured for attachment to a braking mechanism and a second end, connected to the brake pad arm, configured for attachment to a motorcycle;

wherein the brake pad arm and the brake actuator arm are offset at an angle between 50 and 65 degrees; *and*

*wherein the brake pad arm is at least 9 inches long.*

*20. A brake lever assembly for motorcycles having foot boards, the brake lever assembly comprising:*

*a brake pad arm having a first end configured for attachment to a brake pad and a second end configured for attachment to a motorcycle; and*

*a brake actuator arm having a first end configured for attachment to a braking mechanism and a second end, connected to the brake pad arm, configured for attachment to a motorcycle;*

*wherein the brake pad arm and the brake actuator arm are offset at an angle between 50 and 65 degrees; and*

*wherein the first end of the brake pad arm forms a brake pad support for holding a brake pad, wherein the brake pad arm has a long axis, and wherein the brake pad support is disposed in parallel with the long axis of the brake pad arm; and*

*further comprising a brake pad centered over the brake pad arm, and sized such that the brake pad extends laterally outwardly from the brake pad arm no more than 2.5 inches.*

\* \* \* \* \*